(No Model.)
M. G. HAWKE.
THERMOMETER.
No. 440,567. Patented Nov. 11, 1890.
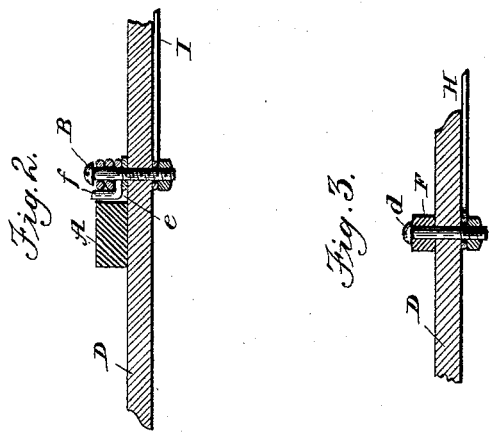
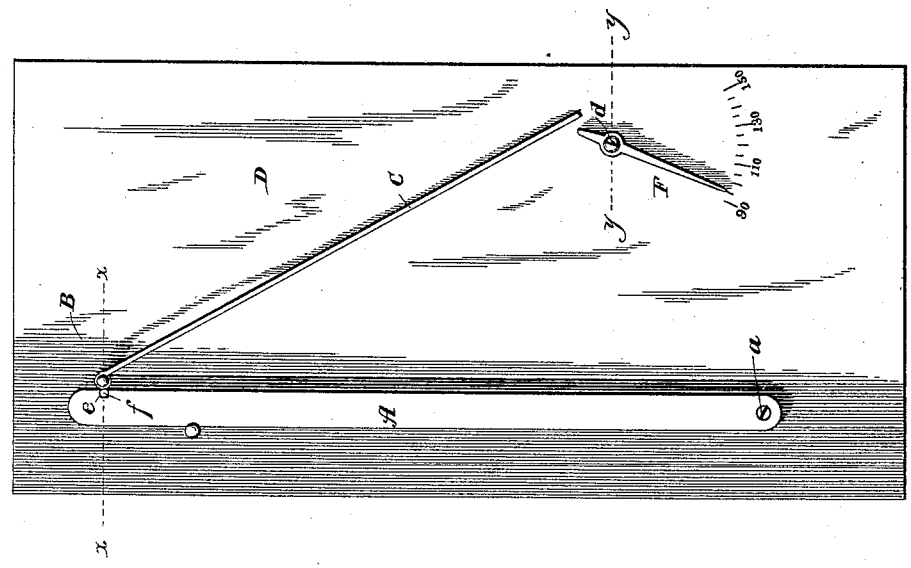
WITNESSES:
Edwin C. Bradford
Wm. K. Ellis
INVENTOR
Madison G. Hawke
BY
E. Everett Ellis
ATTORNEY.

UNITED STATES PATENT OFFICE.

MADISON G. HAWKE, OF SARATOGA SPRINGS, NEW YORK.

THERMOMETER.

SPECIFICATION forming part of Letters Patent No. 440,567, dated November 11, 1890.

Application filed May 10, 1890. Serial No. 351,288. (No model.)

*To all whom it may concern:*

Be it known that I, MADISON G. HAWKE, a citizen of the United States, residing at Saratoga Springs, in the county of Saratoga and State of New York, have invented certain new and useful Improvements in Thermostatic Alarm-Indicators; and I do hereby declare the following to be a full, clear, and exact description of the invention, such as will enable others skilled in the art to which it appertains to make and use the same.

This invention relates to thermostatic alarms for indicating at a convenient point an excessive increase in temperature, or for automatically sounding an alarm or otherwise giving notice of the abnormal increase in the temperature in the vicinity of the thermostatic appliance.

The object of the invention is to provide a device which shall have great sensitiveness and which can be set to give warning at any required temperature.

A further object of the invention is to provide a mechanism that is especially adapted to close an electric circuit of a fire-alarm, burglar, or annunciator system, so as to give ample notice that the danger-point has been reached, said mechanism being adjustable so as to close the circuit when the predetermined degree of temperature shall have been reached, the degree of the temperature being indicated by a pointer on a suitably-graduated dial, the said pointer forming a terminal of the circuit.

A still further object of the invention is to construct a mechanism which shall be simple, compact, and reliable, and which will not be liable to fail in time of need, and which will be extremely sensitive to slight variations in the degree of temperature.

The improvement consists, essentially, of a thermostatic bar, a degree-indicating arm or pointer, and an intermediate arm for magnifying the degree of expansion of the said thermostatic bar.

The improvement further consists of the details of construction and the peculiar arrangement and combinations of the parts, which will be hereinafter more fully described and claimed, and which are shown in the annexed drawings, in which—

Figure 1 is a top plan view of a thermostatic alarm embodying my invention. Fig. 2 is a detail section on the line *x x* of Fig. 1. Fig. 3 is a detail section on the line *y y* of Fig. 1.

The base D, on which the operating parts are mounted, is preferably constructed of a material that will not form an electric conductor and is of proper size and suitable shape to contain the said parts. The thermostatic bar A is securely fastened at one end to the base D by the screw or like fastener *a*, and its other end is free to move when the said bar increases in length due to linear expansion. This bar should be sufficiently stout, so that it will not bend under slight resistance such as will be offered by the arm C, but not so thick as to prevent its adaptation to a sudden change in the temperature. The arm C is pivotally connected with the base by the pivot B as near the thermostatic bar A as possible, and is provided with a short extension *f*, which enters a notch *e* in the side, thereby obtaining a connection between the said arm and the said bar. Obviously the extension *f* may have other forms of connection with the said bar A; but the construction shown is preferred, owing to its simplicity. The distance from the pivot B to the free end of the arm C is sufficiently great to admit of an appreciable movement of the free end of the said arm when the bar A expands or contracts an infinitesimal degree. The pointer F is connected by pivot *d* with the base, and its longer end is adapted to be moved over the dial or graduations G to indicate the degree of temperature.

The reference-letter *g* denotes a stud or pin secured to the base and bearing against one side of bar A, so as to hold said bar in place.

The wires I and H represent the terminals of a circuit of an alarm, annunciator, or other system, the wire H being connected with the pivot *d* and the wire I with the pivot B.

The operation of the invention is as follows: The device being placed in a room and the pointer F set to indicate an abnormal degree of temperature, suppose the heat of the room becomes excessive through some cause, as by fire. The bar A will expand and turn the arm C on its pivot and bring its free end in contact with the short end of the pointer F and close the circuit, thereby indicating at the required point or station or by the predetermined means that the danger-point has been reached in this particular room. The purpose of having the arm F adjustable is to adapt the indicator for general use. In cellars the temperature is generally low, whereas in dwelling-apartments the normal temperature is considerably higher, and in furnace-rooms still higher. Thus what would be a normal temperature in a dwelling-room would be an abnormal temperature in a basement or cellar; hence the desirability of having the indicator adjustable to adapt it to these various conditions.

Having thus described my invention, what I claim as new, and desire to secure by Letters Patent, is—

In a temperature-indicator, the combination, with a base, a vertical thermostatic bar secured to said base at its lower end and having its free end provided with a notch, and a pin or stop secured to said base and bearing against said bar on the side opposite to the notch, of a pivoted arm having an extension engaging with said notch, a pointer pivoted to said base and having an extension adapted to engage with said arm, a dial, and an electrical conductor connected with said arm and pointer, substantially as described.

In testimony whereof I affix my signature in presence of two witnesses.

MADISON G. HAWKE.

Witnesses:
WM. HAY BOCKES,
GEO. L. CORLISS.